Feb 4, 1958    W. R. ANDERSON    2,821,806
INSECT ELECTROCUTION APPARATUS
Filed April 15, 1955
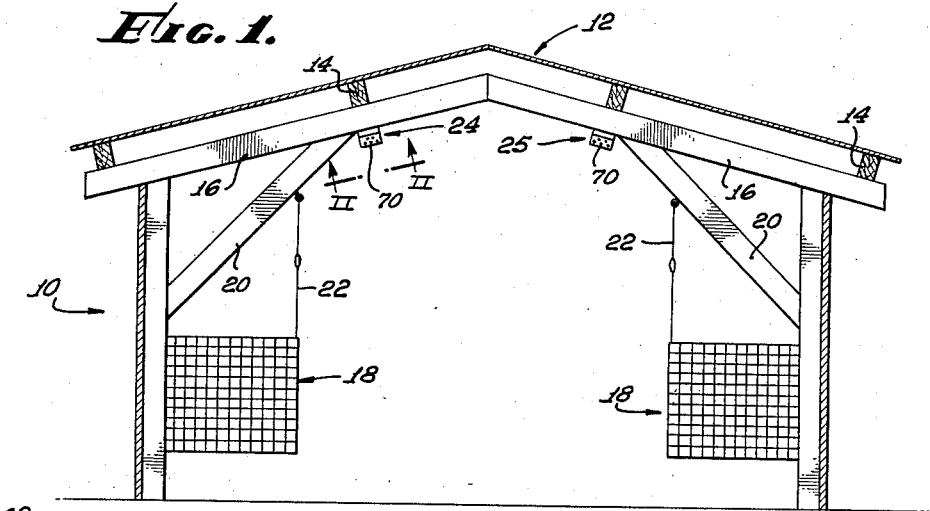
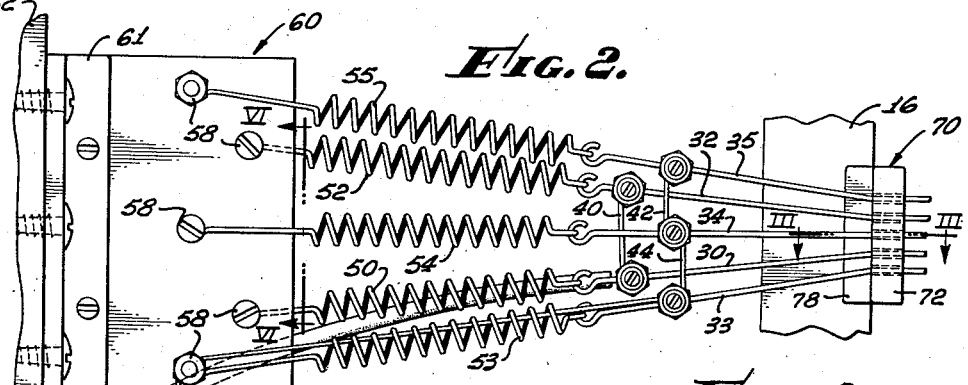
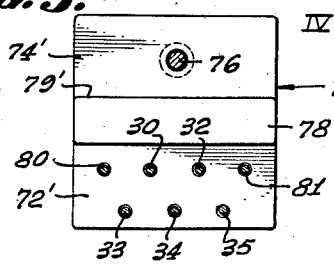
INVENTOR.
WILLIAM R. ANDERSON
BY
ATTORNEY.

United States Patent Office 2,821,806
Patented Feb. 4, 1958

2,821,806

INSECT ELECTROCUTION APPARATUS

William Roland Anderson, Orange, Calif.

Application April 15, 1955, Serial No. 501,642

1 Claim. (Cl. 43—112)

This invention relates generally to insect electrocution apparatus and particularly describes such apparatus adapted to be mounted within a building immediately below and supported by the roof or ceiling structure of the building.

The present invention finds particular application in chicken houses, barns, and similar buildings where flies and other insects are attracted in large numbers. The operative elements of the present apparatus are preferably attached to and supported by the roof of the building wherein the apparatus is used, and the arrangement of electrical conductors is particularly designed to be harmless to humans and animals in the building, an especially desirable characteristic when the apparatus is used in a building having a relatively low roof.

An object of this invention is therefore to disclose novel insect electrocution apparatus for use in a building.

Another object of the invention is to provide insect electrocution apparatus mounted relatively close to the ceiling of a building and including grounded electrical conductors constituting a protective grid around the electrically charged portion of the apparatus.

A further object of the invention is to disclose apparatus of the above character wherein electrical conductors of opposite polarity are spaced apart by a distance greater than the breakdown distance for the voltage used, but close enough that an insect such as a fly on one conductor will effectively shorten the gap between oppositely charged conductors to permit a flow of electrocution current for a short period.

Another object is to disclose insect electrocution apparatus having grounded conductors so arranged as to virtually certainly be contacted first by an approaching portion of a human body such as a finger.

These and other and allied objects of the invention will become clear from a reading of the following description of a preferred embodiment thereof, taken in connection with the accompanying drawing in which:

Fig. 1 is a vertical sectional view of a building such as a chicken house in which the electrocution apparatus of the present invention is mounted.

Fig. 2 is a fragmentary view looking generally upwardly on the line II—II of Fig. 1.

Fig. 3 is a fragmentary sectional view taken on line III—III of Fig. 2.

Fig. 4 is a view partially in section taken on line IV—IV of Fig. 3.

Fig. 5 is a view of a modified form of a supporting insulator which may be used in the present invention.

Fig. 6 is a fragmentary view taken on line VI—VI of Fig. 2.

Referring now in detail to the drawing, there is shown in Fig. 1 a vertical sectional view of a building indicated generally at 10. The building includes a roof indicated generally at 12 which may, for example, be of steel construction, the roof panels resting upon longitudinal members 14, which in turn are supported on rafters 16.

Conventional chicken cages indicated generally at 18 are mounted upon the walls of the building 10 and may be supported from structural members 20 by cables 22. The cages 18 may extend vertically as high and low as may be desired, there being horizontal platforms for individual birds, as is well known.

Extending the entire length of the building 10 is a group of electrical conductors indicated generally at 24. In the present instance two groups of such conductors are shown mounted just beneath the ceiling or roof 12, the second group being indicated generally at 25 and being disposed on the opposite side of the center of the building from the first group of conductors. Each of the groups of conductors 24 and 25 is supported at intervals throughout the length of building 10 by longitudinally spaced insulating blocks 70 described in greater detail hereinafter.

Within each group of conductors, such as 24, there are one or more charged conductors 30 and 32 (see Figs. 3 and 4). Also in the group of conductors 24 there is included a plurality of electrically grounded wires indicated at 33, 34 and 35. In the preferred construction of the present invention the spacing between one of the charged conductors 30 or 32 and any one of the grounded wires 33, 34 and 35, should be appreciably greater than the breakdown potential in air for the voltage used in the system. On the other hand, the conductors of opposite polarity should be close enough that the interposition of the body of a fly or other insect of comparable size effectively shortens the air gap so that lethal current passes through the insect and kills it. When the charged conductors are energized with about 4500 volts, as is done in a preferred form of the invention, the apparatus operates satisfactorily with the conductors of opposite polarity spaced apart by a distance of between about 3/8 and 1/2 of an inch.

It is to be noted that the charged conductors 30 and 32 are disposed in side-by-side relation and the grounded conductors 33, 34 and 35 are spaced downwardly therefrom. The two groups of conductors desirably lie in planes which are virtually parallel to one another and are spaced apart by a distance of approximately one-half of an inch. The electrically charged conductors 30 and 32 are connected together by a jumper 40 and the three grounded conductors 33, 34 and 35 are similarly connected together by jumper means 42 and 44.

Since the conductors extend for the entire length of the structure, which may amount to 50 feet or more, it is necessary that each conductor be maintained under tension in order to assure virtually constant spacing between adjacent conductors and thus to achieve maximum effectiveness of the apparatus. Means are provided to accomplish this including resilient springs 50 and 52, connected respectively to conductors 30 and 32, and similar resilient springs 53, 54 and 55 connected respectively to the lower conductors 33, 34 and 35. The outer ends of each of the resilient springs is connected by suitable fastening means 58 to a block, indicated generally at 60 and made of insulating material such as a suitable ceramic or the like. The block 60 is attached to a flanged mounting bracket 61 which in turn is fixed to a structural member 62 of the building, such as a roof truss. As best seen in the fragmentary view of Fig. 6, the insulating block 60 is of considerably greater thickness than the vertical spacing between the parallel planes in which the conductors lie. Hence the conductors and springs diverge in their approach to the block 60 so that no short-circuit is possible.

An insulated conductor 65 is connected to the conductor 30 and, through jumper 40, to conductor 32 to energize these two conductors, and is adapted to be connected to a suitable source of electrical potential which illustratively may be approximately 4500 volts. A second lead 66 is connected to conductor 33 and, through jumpers 44 and 42, to conductors 34 and 35, and is adapted to be grounded as indicated.

Throughout the length of the structure 10, the conductors 30 and 32, as well as the grounded wires 33, 34 and 35 are maintained in the relationship seen in Figs. 2, 3 and 4, by a number of spaced insulating blocks such as the one shown at 70 and seen in detail in Figs. 3 and 4. Desirably the block 70 includes a lower skirt portion 72 in which holes are formed to accommodate the several conductors previously mentioned. As best appears in Fig. 4, the particular insulating block there illustrated includes a total of five conductors. In another illustrative embodiment as appears in Fig. 5, there are seven conductors carried by the spacer block 70'. In either case, the upper portion of the spacer block 70 and 70' includes base portion 74 and 74' adapted to be fixed to a transverse structural member 16 by a suitable fastening means 76 extending through a hole formed in the base portion. Approximately midway of the depth of the block 70 or 70' there is provided a flange 78 and 78' forming an upwardly directing shoulder 79 and 79' adapted to abut against the lower surface of the structural member 16 and thus to accurately align the several spacer blocks 70 or 70' throughout the length of the building 10.

With further and more detailed reference to the modified form of the invention seen in Fig. 5, the spacer block 70' includes in its lower skirt 72' holes for accommodating charged conductors 30 and 32 and holes for accommodating grounded conductors 33, 34 and 35, this much of the structure of Fig. 5 being identical with Fig. 4. In the structure of Fig. 5, however, there are also included two additional holes for accommodating grounded conductors 80 and 81.

The purpose of the grounded conductors 33, 34, and 35 (and, when used, 80 and 81), is two-fold. First, such conductors afford a source of ground potential close enough to the charged conductors 30 and 32 so that an insect resting on one of the conductors and with its body extending toward a conductor of opposite polarity will so shorten the air gap between the conductors as to permit an electric current to flow through its body. Secondly, the grounded conductors minimize inadvertent contact with charged conductors 30 and 32 by a portion of a person's body or by a tool such as a shovel handle, a ladder or the like. Thus the grounded conductors 33, 34 and 35, as well as 80 and 81 when used, constitute a protective grid partially surrounding the charged conductors 30 and 32. The spacing between adjacent grounded conductors such as 34 and 35, is desirably in the range of ⅜ to ⅝ of an inch or approximately ½ of an inch for an average installation. This spacing makes it virtually impossible for a person to bring any part of his body into contact with a charged conductor 30 or 32 without first contacting one of the grounded conductors and remaining in contact with such grounded conductor. As a practical matter only one's finger could make contact with a charged conductor, and even in this unlikely event the finger would also contact a grounded conductor. At worst, therefore, the end portion of a finger might receive a shock but no dangerous passage of current through a person's body would result.

Grounding of the apparatus immediately beneath the roof of a structure has the further advantage that flies and other insects killed by the present apparatus fall immediately to the floor whence they may be removed by sweeping or flooding. The bodies of the dead insects are therefore not retained near the lethal appartus either to serve as a warning to their fellows or to contribute by their presence to an unsanitary environment.

Accordingly it will be seen that the present invention contemplates, in its simplest form, the provision of an electrically charged conductor extending longitudinally within a building and beneath the roof thereof, and a pair of grounded wires parallel to and below the charged conductor, the grounded wires being in horizontally staggered relation relative to the vertical plane containing the charged conductor. As shown by the several forms of the invention disclosed herein, more than one charged conductor may be used, and additional grounded wires may also be employed, the grounded wires being disposed to form a protective grid, effectively shielding the charged conductor or conductors from inadvertent contact by a human being or animal.

Many modifications and changes from the specific illustrative form of the invention hereinabove shown and described will occur to those skilled in the art and are within the contemplation of the invention as defined in the appended claim.

I claim:

In combination: a building having a longitudinally extending roof; an electrical conductor carried by the roof and spaced therebelow and parallel thereto; a pair of electric wires parallel to and below said conductor and horizontally spaced on either side of the vertical plane containing the conductor, the wires being less than ⅝ths of an inch apart and a third wire in substantial horizontal alignment with said conductor; electrically insulating mounting and spacing members for maintaining the conductor and wires in their positions as stated, the members being fastened to the roof and disposed at longitudinal intervals therealong; means for electrically grounding said wires; and means for electrically charging said conductor with a voltage slightly below the breakdown voltage in air for the distance separating the conductor and wires.

References Cited in the file of this patent

UNITED STATES PATENTS

| | | |
|---|---|---|
| 974,785 | Frost | Nov. 8, 1910 |
| 2,095,323 | Di Marino | Oct. 12, 1937 |
| 2,098,647 | Lindsley | Nov. 9, 1937 |
| 2,154,418 | Christensen | Apr. 18, 1939 |
| 2,165,560 | Luther | July 11, 1939 |
| 2,219,743 | Karr | Oct. 29, 1940 |